ated Feb. 25, 1958

2,824,895

ALKYLATION OF ARYLAMINES

John P. Luvisi, Riverside, Ill., assignor to Universal Oil Products Company, Des Plaines, Ill., a corporation of Delaware No Drawing. Application August 29, 1955
Serial No. 531,295

9 Claims. (Cl. 260—578)

This invention relates to a process for preparing nuclearly substituted arylamines and more particularly to a method of preparing C-alkyl arylamines.

It is an object of this invention to prepare substituted arylamines.

It is a further object of this invention to prepare C-alkyl aniline compounds.

One embodiment of this invention is found in the process for the preparation of a nuclearly substituted arylamine by reacting an organic halide selected from the group consisting of aryl and alkyl halides with an arylamine in the presence of an alkali metal sand and recovering the resultant nuclearly substituted arylamine.

A further embodiment of this invention resides in a process for the preparation of a C-alkyl aniline by reacting an alkyl halide with aniline in the presence of sodium sand at a temperature in the range of from about 75° to about 150° C. preferably at the reflux temperature of the alkyl halide, and recovering the resultant C-alkyl aniline.

A specific embodiment of the invention resides in a process for the preparation of a C-amyl aniline which comprises reacting amyl chloride with aniline in the presence of sodium sand at a temperature in the range of from about 75° to about 150° C. preferably at the reflux temperature of the alkyl halide, and recovering the resultant amyl aniline.

Other objects and embodiments referring to alternative arylamines and to alternative alkyl and aryl halides will be found in the following further detailed description of the invention.

Nuclearly substituted aryl amines may be prepared by reacting an alkyl or aryl halide with an aryl amine in the presence of a catalyst comprising an alkali metal sand to yield C-alkyl arylamines. These compounds, using aniline and amyl chloride as examples, may be prepared according to the following equations:

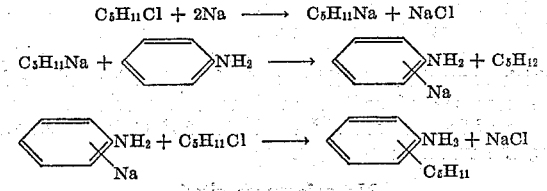

The nuclearly alkylated aryl amines are used as oxidation inhibitors or antiozidants as such, or as intermediates in the preparation of dyes. The said C-alkyl arylamines can be diazotized and coupled with phenol, aniline, etc., yielding dyes. Other uses are intermediates in the preparation of detergents, e. g. polymerizing said C-alkyl arylamines in the presence of ethylene oxide, and intermediates in the preparation of fungicides.

Examples of alkyl halides which may be used in this invention include methyl chloride, ethyl chloride, propyl chloride, isopropyl chloride, butyl chloride, isobutyl chloride, t-butyl chloride, amyl chloride, isoamyl chloride, hexyl chloride, heptyl chloride, etc., methyl bromide, ethyl bromide, propyl bromide, isopropyl bromide, butyl bromide, isobutyl bromide, t-butyl bromide, amyl bromide, isoamyl bromide, hexyl bromide, heptyl bromide. Aryl halides which may be used include chlorobenzene, bromobenzene, fluorobenzene, o-chlorotoluene, m-chlorotoluene, p-chlorotoluene, etc. Arylamines which are nuclearly substituted by the aforementioned alkyl or aryl halides in the process of this invention include aniline, m-toluidine, o-toluidine, p-toluidine, phenylenediamine, α-naphthylamine, β-naphthylamine, 1,4-naphthylamine, α-anthracylamine, β-anthracylamine, phenanthrylamine, etc. It is also contemplated within the scope of this invention that alkenyl halides may be used in place of alkyl or aryl halides, although not necessarily with equivalent results.

The reaction between the alkyl or aryl halide and the aryl amine will take place in the presence of an alkali metal sand, the preferred sands comprising sodium and potassium, although lithium and cesium sand may also be used. In addition, the reaction may also take place in the presence of an alkaline alkoxide such as potassium ethoxide, potassium propoxide, sodium ethoxide, sodium isopropoxide, etc., the alkaline alkoxides being used to increase the yields of the desired product. The reaction will proceed at an elevated temperature usually in the range of from about 75° to about 200° C. or more, the preferred range being from about 75° to about 150° C. or at the reflux temperature of the alkyl halide being used. In addition, when lower boiling alkyl halides are used the reaction will proceed at superatmospheric pressures ranging from about 5 atmospheres to about 50 atmospheres or more, said superatmospheric pressures being provided by the introduction of an inert gas such as nitrogen into the reaction vessel. The use of alkyl or aryl halides boiling within the range of from about 75° to about 200° C. will obviate the need of superatmospheric pressures, in which case the reaction will proceed at atmospheric pressure.

Examples of C-alkyl or aryl arylamines which may be prepared by the process of this invention include o-methyl anilinie, m-methyl aniline, p-methyl aniline, o-ethyl aniline, m-ethyl aniline, p-ethyl aniline, o-propyl aniline, m-propyl aniline, p-propyl aniline, o-butyl aniline, m-butyl aniline, p-butyl aniline, o-amyl aniline, m-amyl aniline, p-amyl aniline, etc., o-methyl naphthylamine, m-methyl naphthylamine, p-methyl naphthylamine, o-ethyl naphthylamine, m-ethyl naphthylamine, p-ethyl naphthylamine, etc.; phenyl aniline, tolyl aniline, ethylbenzyl aniline, β-phenyl-α-naphthylamine, etc.

The process of this invention may be effected in any suitable manner and may comprise either a batch or continuous type operation. When a batch type operation is used, a quantity of the starting materials, namely the arylamine and the alkyl or aryl halide are placed in a proper apparatus such as an alkylating flask or in a rotating autoclave along with the catalyst such as sodium or potassium sand and, if so desired, the metallic alkoxide. The flask is then heated to the desired reaction temperature while continuously agitating the contents of said flask. In the event that a low boiling alkyl halide is used as one of the reactants an inert gas such as nitrogen is introduced into the apparatus until the desired pressure has been reached which will allow the reaction to proceed in the temperature range hereinbefore set forth. After a predetermined residence time has elapsed the flask and contents thereof are cooled to room temperature and the C-alkyl or aryl arylamine is separated from the unreacted starting materials by conventional means such as fractional distillation under reduced pressure, crystallization, etc.

The process of this invention may also be carried out in a continuous type operation. When such a method is used, the arylamine and the alkyl or aryl halide are continuously introduced into a reactor containing the catalyst, said reactor being maintained at the proper operating conditions of temperature and pressure. The reactor may comprise an unlined vessel or coil, or may contain an adsorbent packing material such as fire brick, alumina, dehydrated bauxite and the like. The aforementioned starting materials may be continuously introduced into the vessel in separate single streams or, if so desired, may be commingled before introduction into the vessel and thus charged in a single stream. The desired C-alkyl or aryl arylamine is continuously withdrawn from the reactor and separated from the catalyst, said separation being followed by further separation of the desired reaction product from any unreacted arylamine and alkyl or aryl halide, the latter two compounds being recycled to form a portion of the feed stock while the desired reaction product is purified by conventional means hereinbefore set forth.

The following examples are given to illustrate the process of this invention but, are not intended to limit the generally broad scope of the present invention in strict accordance therewith.

Example I 64 g. of ethyl chloride is added to a rotating autoclave containing 46 g. of sodium sand, 93 g. of aniline and 5 g. of potassium isopropoxide maintained at a temperature of approximately 100° C. and at a superatmospheric pressure of about 35 atmospheres of nitrogen during a period of about 1 hour, said mixture being continuously stirred during the time of addition. The contents of the flask are stirred for an additional 3 hours, at the end of which time the autoclave and contents thereof are allowed to cool to room temperature, the pressure released, and the reaction layer separated from the catalyst layer. The reaction product is subjected to fractional distillation, the cut boiling at a temperature of 211–216° C., comprising ethylaniline is separated out and purified.

Example II

A mixture of 93 g. of aniline and 78 g. of propyl chloride are condensed in the presence of sodium sand and potassium isopropoxide in a manner similar to that set forth in Example I above. At the end of 4 hours the autoclave in which the reaction takes place is cooled to room temperature and the reaction products separated from the catalyst layer. The reaction product is subjected to fractional distillation and the cut boiling at a temperature of from about 222–226° C., comprising a mixture of o-propyl aniline and p-propyl aniline is separated out and purified. This fraction may then be separated into its components, that is, o-propyl aniline and p-propyl aniline by further fractional distillation.

Example III 106 g. of n-amyl chloride is added to an alkylation flask containing 93 g. of aniline, 46 g. of sodium sand, and 5 g. of potassium isopropoxide. The flask is heated to approximately 105–107° C., the reflux temperature of the amyl chloride, and maintained thereat for a period of about 4 hours. At the end of this time the flask and contents thereof are allowed to cool to room temperature and the reaction products are separated from the catalyst layer. The reaction products are subjected to fractional distillation and the cut comprising a mixture of n-amyl aniline is separated out, purified and subjected to further fractional distillation to separate the isomers.

I claim as my invention:

1. A process for the preparation of a nuclearly substituted arylamine which comprises reacting an organic halide selected from the group consisting of alkyl and aryl halides with an arylamine in the presence of an alkali metal sand, and recovering the resultant nuclearly substituted arylamine.

2. A process for the preparation of a C-alkyl arylamine compound which comprises reacting an alkyl halide with an arylamine in the presence of an alkali metal sand at a temperature in the range of from about 75° to about 200° C., and recovering the resultant C-alkyl arylamine.

3. A process for the preparation of a C-aryl arylamine compound which comprises reacting an aryl halide with an arylamine in the presence of an alkali metal sand at a temperature in the range of from about 75° to about 200° C., and recovering the resultant C-aryl arylamine.

4. A process for the preparation of a C-alkyl aniline which comprises reacting an alkyl halide with aniline in the presence of an alkali metal sand at a temperature in the range of from about 75° to about 150° C. and at a pressure in the range of from about atmospheric to about 50 atmospheres or more, and recovering the resultant C-alkyl aniline.

5. A process for the preparation of a C-alkyl aniline which comprises reacting an alkyl halide with aniline in the presence of sodium sand at a temperature in the range of from about 75° to about 150° C. and at a pressure in the range of from about atmospheric to about 50 atmospheres or more, and recovering the resultant C-alkyl aniline.

6. A process for the preparation of a C-ethyl aniline which comprises reacting ethyl chloride with aniline in the presence of a sodium sand at a temperature in the range of from about 75° to about 150° C. and at a pressure of from about 25 to about 35 atmospheres, and recovering the resultant C-ethyl aniline.

7. A process for the preparation of a C-propyl aniline compound comprises reacting propyl chloride with aniline in the presence of sodium sand at a temperature in the range of from about 75° to about 150° C. and at a pressure of from about 25 to about 35 atmospheres, and recovering the resultant C-propyl aniline.

8. A process for the preparation of a C-amyl arylamine compound which comprises reacting amyl chloride with an arylamine in the presence of sodium sand at a temperature in the range of from about 75° to about 150° C., and recovering the resultant C-amyl arylamine.

9. A process for the preparation of a C-amyl aniline which comprises reacting amyl chloride with aniline in the presence of sodium sand at a temperature in the range of from about 75° to about 150° C., and recovering the resultant amyl aniline.

No references cited.